United States Patent [19]

Louw

[11] 4,317,534
[45] Mar. 2, 1982

[54] LUGGAGE CARRIER

[76] Inventor: Franklin S. Louw, P.O. Box 116, Bedfordview 2008, South Africa

[21] Appl. No.: 182,729

[22] Filed: Aug. 29, 1980

[30] Foreign Application Priority Data

Sep. 6, 1979 [ZA] South Africa ...................... 79/4721

[51] Int. Cl.³ ............................ B60R 9/12; B60R 9/04
[52] U.S. Cl. ................................... 224/328; 224/329; 224/316
[58] Field of Search ............... 224/329, 316, 319, 327, 224/328, 324; 220/345

[56] References Cited

U.S. PATENT DOCUMENTS

| | | | |
|---|---|---|---|
| 1,721,132 | 7/1929 | Orthwine | 220/345 X |
| 2,985,350 | 5/1961 | Taccolini | 224/319 |
| 3,006,519 | 10/1961 | Doane | 224/316 X |
| 3,190,515 | 6/1965 | Vielle | 224/328 X |
| 3,915,362 | 10/1975 | Hart | 224/328 |
| 4,084,735 | 4/1978 | Kappas | 224/324 X |

Primary Examiner—Steven M. Pollard
Attorney, Agent, or Firm—Karl W. Flocks

[57] ABSTRACT

An enclosed luggage carrier mountable on the roof of a motor vehicle. The carrier may be streamlined thereby providing less drag during travelling than with other roof carriers known to the applicant.

2 Claims, 5 Drawing Figures

LUGGAGE CARRIER

This invention relates to a luggage carrier of the kind which is mountable on the roof of a vehicle. Roof carriers known to the applicant, are in the form of frames which are prone to cause wind howl when unloaded while travelling. Goods packed on such frames also cause excessive drag.

It is an object of this invention to provide a carrier which will not have these disadvantages.

According to the invention, there is provided a luggage carrier which comprises a casing defining an enclosed packing space and having mounting means adapted for securing to a vehicle roof carrier; and at least one door adapted to cover an opening providing access into the packing space inside the casing.

The door may be a sliding door co-operating with grooves in the casing. Alternatively the door may be hinged and may depend from an elevated hinge over the opening.

The door may be accessible from one side of the vehicle when the roof carrier is mounted on the roof of the vehicle. The door may be slidable in a forward and rearward direction for opening and closing. If desired, two doors may be provided on opposite sides of the casing.

The casing may have rounded ends which in longitudinal side elevation diverge towards a central body portion of the casing to give a streamlined effect.

The casing may be of sheet metal pressings. Alternatively, it may be a moulding of a synthetic plastics material, eg of fibreglass. The casing may be streamlined to reduce wind resistance while travelling.

The space inside the casing may be divided into compartments, by partitions inside the casing, the compartments being adapted to receive articles of luggage of different size.

The invention will now be described by way of example with reference to the accompanying drawings.

Figure 1:
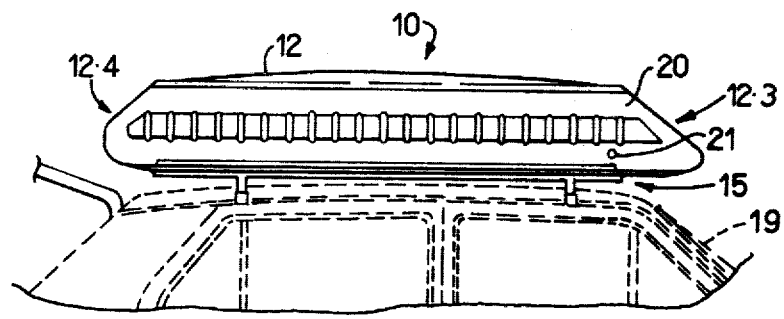
FIG. 1 shows a side view of a roof carrier according to the invention.

Referring to the drawings, reference numeral 10 refers generally to a luggage roof carrier combination according to the invention. It comprises a casing 12 having mounting means in the form of bolts 14 adapted for securing the casing to a roof carrier 15 having transverse bars 16, on the roof 18 of a vehicle 19. The casing 12 has sliding doors 20 on opposite sides, sliding in a forward and rearward direction in grooves 12.1 and 12.2. The casing has internal walls 22, 24, 26, 28, and 30 dividing the internal space into cavities 32, 34, 36, 38, and 40.

Figure 2:
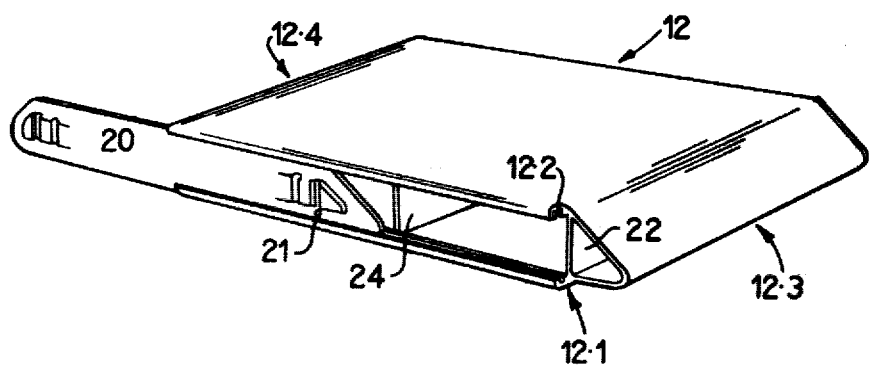
FIG. 2 shows an oblique front view of a roof carrier according to the invention.
Figure 3:
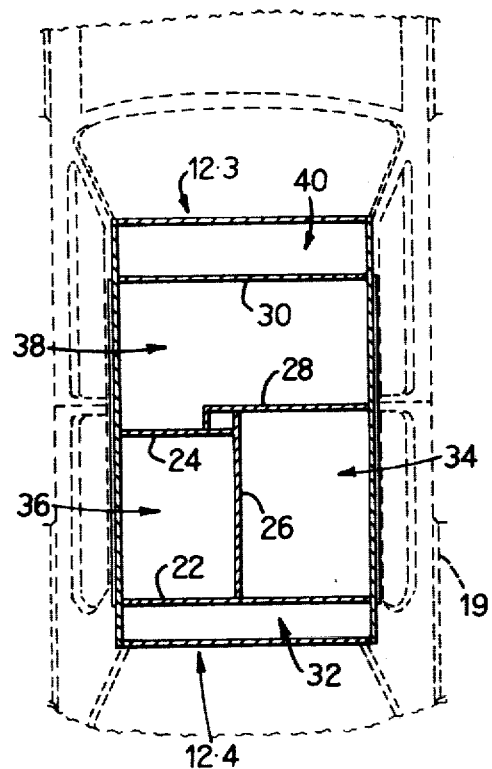
FIG. 3 shows a sectional plan view at III—III in FIG. 1.

The front and rear ends 12.3 and 12.4 respectively of the casing have rounded formations as seen in FIGS. 1 and 2, diverging towards a central body portion, to provide a streamlined effect.

Figure 5:
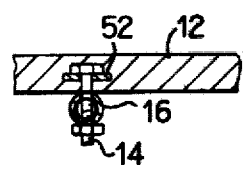
FIG. 5 shows a detailed sectional side elevation at V—V in FIG. 4.
Figure 4:
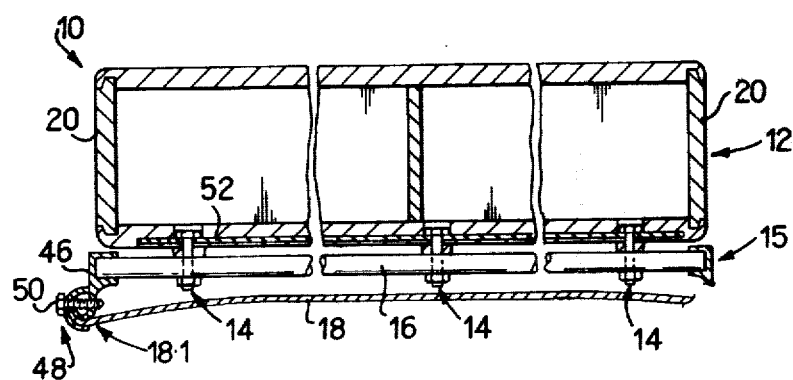
FIG. 4 shows a detailed sectional elevation at IV—IV in FIG. 1.

Referring now to FIGS. 4 and 5 of the drawings, the roof carrier 15 comprises a pair of longitudinally spaced transverse bars 16 to which is bolted the underside of the casing 12 by means of bolts 14 which are integrally moulded with the underside of the casing 12. The ends of the bars 16 are supported by legs 46 seating in the gutters 18.1 of the roof 18 of the motor vehicle 19. The legs 46 are gripped firmly by clamps 48 co-operating with screws 50. Reinforcing metal strips 52 are embedded in the bottom of the carrier 12, in order not to provide excessive drag during travel.

The roof carrier may have an overall depth which is equal to about a third or half its width, or about a third or a quarter its length. This will still provide adequate packing space without excessive drag during travel.

The sliding door 20 may be provided with a lock 21 so that it may be locked.

Furthermore, if desired, the roof of the car may be provided with sockets for co-operating with mating spigot formations on the roof carrier. Accordingly, the invention extends also to the combination of a roof carrier as described, with a motor vehicle having sockets to accommodate mating spigot formations provided on the roof carrier.

I claim:

1. A luggage carrier for use on the top of a vehicle comprising a molded casing defining an enclosed packing space including
   a roof panel vertically spaced from a floor panel,
   a forward shaped and generally tapered section,
   a rear shaped and generally tapered section, transverse vertical walls fast to said roof panel and to said floor panel for dividing said packing space into a multiplicity of compartments including
   a forward compartment,
   a rear compartment and
   an intermediate compartment, an open-ended groove formed in one side of said roof panel an open-ended groove formed in the corresponding side of said floor panel,
   laterally spaced side panels having ends
   shaped to correspond to the sides of said
   forward and rear sections, at least one of said side panels being slidably mounted between said open-ended grooves to provide access to said packing space, whereby the slidable panel may be moved rearwardly, in said open-ended grooves, to expose and provide access from the side to the forward compartment or the forward and intermediate compartments and also may be moved forwardly to provide access from the side to the rear compartment or the rear compartment and the intermediate compartments.

2. A carrier in accordance with claim 1 wherein the second opposite panel is slidably movable in open-end grooves formed in the opposite side of said roof panel and in the opposite side of said floor panel whereby access is provided to both sides of said casing and the compartments therein.

* * * * *